United States Patent
Fadeev et al.

(10) Patent No.: US 10,165,063 B2
(45) Date of Patent: Dec. 25, 2018

(54) INFERRING ADDITIONAL EMAIL ADDRESSES TO MATCH EMAIL ADDRESSES IN A DIGEST LIST

(71) Applicant: Facebook, Inc., Menlo Park, CA (US)

(72) Inventors: Aleksey Sergeyevich Fadeev, Seattle, WA (US); Li Zhou, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 177 days.

(21) Appl. No.: 15/184,974

(22) Filed: Jun. 16, 2016

(65) Prior Publication Data

US 2017/0366500 A1    Dec. 21, 2017

(51) Int. Cl.
*G06F 15/16*     (2006.01)
*H04L 29/08*     (2006.01)
*H04W 4/21*      (2018.01)
*H04L 29/12*     (2006.01)

(52) U.S. Cl.
CPC ............ *H04L 67/20* (2013.01); *H04L 67/306* (2013.01); *H04W 4/21* (2018.02); *H04L 61/1564* (2013.01); *H04L 61/2038* (2013.01); *H04L 61/307* (2013.01)

(58) Field of Classification Search
CPC . H04L 61/1564; H04L 61/2038; H04L 67/20; H04L 67/306; H04W 4/21

USPC ................ 709/202–203, 217–219, 245–246
See application file for complete search history.

(56) References Cited

U.S. PATENT DOCUMENTS

| | | | | |
|---|---|---|---|---|
| 9,379,896 | B1 * | 6/2016 | Altman | G06F 21/31 |
| 9,509,768 | B2 * | 11/2016 | Ormseth | H04L 67/20 |
| 2006/0090073 | A1 * | 4/2006 | Steinberg | G06F 21/31 713/170 |
| 2017/0324626 | A9 * | 11/2017 | Bruich | H04L 67/306 |
| 2017/0351733 | A1 * | 12/2017 | Zhou | G06F 17/30392 |

* cited by examiner

*Primary Examiner* — Bharat Barot
(74) *Attorney, Agent, or Firm* — Fenwick & West LLP

(57) ABSTRACT

An online system receives third party hashes for a plurality of targeted users and generates local hashes for one or more local users of the online system. The online system identifies as matched users those local users with local hashes that match those of the third party hashes. The online system generates one or more inferred identifiers for each of the one or more local users, the inferred identifiers being of the same type as the local unique identifiers, and the inferred identifiers generated based on characteristics of each corresponding local user. The online system identifies as inferred matched users at least one of the local users that have local hashes of corresponding inferred identifiers that match a third party hash of a third party unique identifier. The online system provides, to a third party system, a selection including the matched users and a selection including the inferred matched users.

20 Claims, 2 Drawing Sheets

INFERRING ADDITIONAL EMAIL ADDRESSES TO MATCH EMAIL ADDRESSES IN A DIGEST LIST

BACKGROUND

This disclosure relates generally to online systems storing identity information for users, and in particular to inferring additional email addresses to match email addresses in a digest list.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities.

In some cases, a third party system provides the online system with a list of user identifying information. This information is typically hashed or obscured using a one-way transformation such that the online system may determine if local information matches this obscured information, but cannot recover any useful data from the obscured information directly.

The hashed user identifying information may typically include an email address, which includes a prefix, such as "john.doe" the at sign "@" and a domain, such as "acme.com." However, the email address provided by the third party system for a third party user may not match an email address stored by the online system for a local user, although the local user indicated by the online system using that email address is the same as the third party user indicated by the third party system.

SUMMARY

Embodiments of the invention include an online system that receives hashed identifiers from a third party system and matches these identifiers to identifiers of local users of the online system. The online system also generates inferred identifiers using profile information of local users, and matches these to the received hashed identifiers as well. This allows the online system to match additional users.

The online system receives third party hashes for a plurality of targeted users. Each hash is generated from a third party unique identifier of a corresponding targeted user.

The online system generates local hashes for one or more local users of the online system. Each local hash is generated from a local unique identifier of a corresponding local user, and the local unique identifier of each local user is maintained by the online system. The online system may generate the local hashes using the same hash function used to generate the third party hashes. In one embodiment, the unique identifiers may be email addresses.

The online system identifies as matched users those local users with local hashes that match those of the third party hashes corresponding to one of the plurality of targeted users. For example, a third party hash may be "d63fee3108d916c539c057428a782945c53c054d," which is hashed from "wile.e.coyote@acme.com." If a local user also has an identifier of "wile.e.coyote@acme.com," then the online system generates a local hash that matches the third party hash. This local user would be matched user.

The online system generates one or more inferred identifiers for each of the one or more local users excluding the matched users. The inferred identifiers are of the same type (e.g., email addresses) as the local unique identifiers of the one or more local users. The online system generates the inferred identifiers based on characteristics of each corresponding local user as maintained by the online system. These characteristics may include preferences, information, and other details about each local user as stored in a user profile of the online system for that local user.

In one embodiment, the unique identifiers are email addresses. In such an embodiment, the online system generates the inferred identifiers by generating one or more inferred email prefixes and generating one or more inferred email domains. These are then combined to form the inferred email addresses. The inferred prefixes may be generated by the online system based on combinations of elements stored in the user profile information for the local user. These elements may include elements stored in the user profile information for the local user, such as a display username, date of birth, first name, last name, local user's preferences, a location history of the local user, and a job history. Thus, an example of an inferred prefix may be "bbunny" for a user "Bugs Bunny."

The inferred email domains may be generated based on a list of top domains. This list of top domains may be based on a survey of top email domains associated with users of the online system within a geographic region of the local user or an age bracket for the local user. For example, a local user in one country may have as a set of top domains the top email domains for that country (e.g., Russia may have "yandex.ru," USA may have "hotmail.com"). As another example, the top email domains may be based on the user's age, as certain age groups may prefer different email domains. Other characteristics may also be used to determine the top email domains (e.g., other demographic information).

In one embodiment, the online system generates one or more inferred domains based on elements stored in the user profile information for the local user, such as an email domain of an entity indicated in the user profile information for the local user. For example, if a user works for a particular organization, that organization's email domain may be used as an inferred domain.

As noted, the online system combines these inferred prefixes and domains in different combinations for a local user. The online system identifies as inferred matched users at least one of the local users that have local hashes of corresponding inferred identifiers that match a third party hash of a third party unique identifier of one of the plurality of targeted users. The online system excludes the identifiers of the already matched users from this identification process.

The online system provides to the third party system a selection including the matched users and a selection including the inferred matched users.

In one embodiment, the online system also assigns a confidence score to each inferred identifier based on a number of unique elements used to generate that inferred identifier and provides this confidence score to the third party system. For example, if a first name, last name, organization, and date of birth were used to generate the inferred identifier, then this inferred identifier may have a higher confidence score than one that was generated only with a name and date of birth.

The online system may also determine an error rate of the generation of the inferred identifiers by excluding a percentage of the one or more local users prior to generating the inferred identifiers. In other words, these users are in a holdout group. The online system, after generating the inferred identifiers, determines the error rate as the percentage of the inferred identifiers that match identifiers of users in the excluded local users. For example, out of one million local users, the online system may exclude 10,000 of these local users and generate inferred identifiers for the remaining non-excluded local users. These excluded users are the holdout users. Ideally, there should be very few matches between the unique identifiers of users in the holdout group and the inferred identifiers. However, if the inferred identifiers are generated by the online system using rules that are too inclusive, these erroneous matches may be generated. Using the above example, the inferred identifiers should ideally not match any of the identifiers for the local users in the holdout group. The online system may adjust the parameters of the generation of the inferred identifiers (e.g., which elements in the user profile to use, what minimum lengths to have, etc.) in order to reach an acceptable error rate.

The online system may attempt to reduce the number of errors by discarding inferred identifiers generated with elements that are common to local users of the online system that are beyond a certain threshold. For example, if inferred identifiers were generated using a common name in the online system, those inferred identifiers may be discarded. The online system may also reduce the number of errors by discarding inferred identifiers below a certain number of characters.

Using such a system, an online system may be able to match additional users from a list of hashed identifiers provided by the third party system, while also ensuring a certain quality level in the likelihood that these additional matches are the same users as those identified in the hashed identifiers. This allows the third party system to target additional individuals of the online system and reach a broader audience even if those users in the additional matches had not provided the same identifier to the online system as the identifier recorded by the third party system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
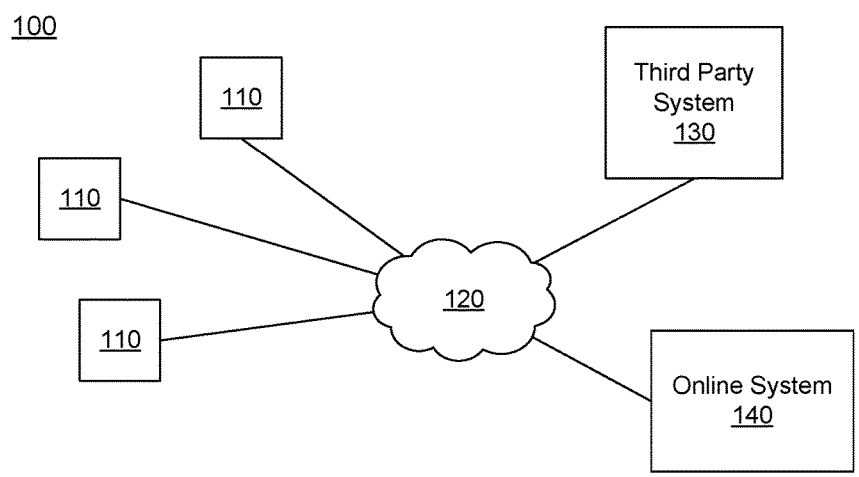
FIG. 1 is a high level block diagram of a system environment for an online system, according to an embodiment.

FIG. 1 is a high level block diagram of a system environment 100 for an online system 140 to infer additional email addresses to match email addresses in a digest list, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a sponsored content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130. Specifically, in one embodiment, a third party system 130 communicates sponsored content, such as advertisements, to the online system 140 for display to users of the client devices 110. The sponsored content may be created by the entity that owns the third party system 130. Such an entity may be an advertiser or a company producing a product or service that the company wishes to promote.

The third party system 130 may provide additional information to the online system 140 in some cases. In one embodiment, the third party system 130 may provide one or more identifiers that identify one or more third party system users. These identifiers may be in plaintext, such as an email address, or may be hashed identifiers that are hashed using a hash function.

Figure 2:
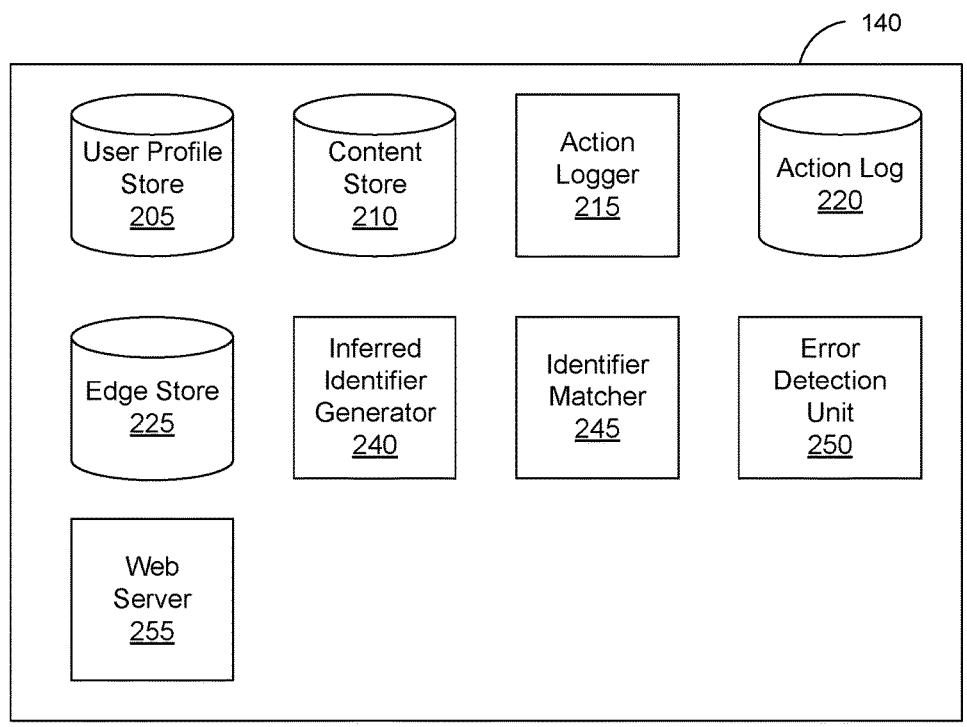
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225 an inferred identifier generator 240, an identifier matcher 245, an error detection unit 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. Patent Pub. No. 2012/0166532, filed on Dec. 23, 2010, U.S. Patent Pub. No. 2014/0156744, filed on Nov. 30, 2012, U.S. Patent Pub. No. 2014/0156566, filed on Nov. 30, 2012, and U.S. Patent Pub. No. 2014/0156360, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 255 links the online system 140 via the network 120 to the one or more client devices 110, as well as to the one or more third party systems 130. The web server 140 serves web pages, as well as other web-related content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or RIM®.

Figure 3:
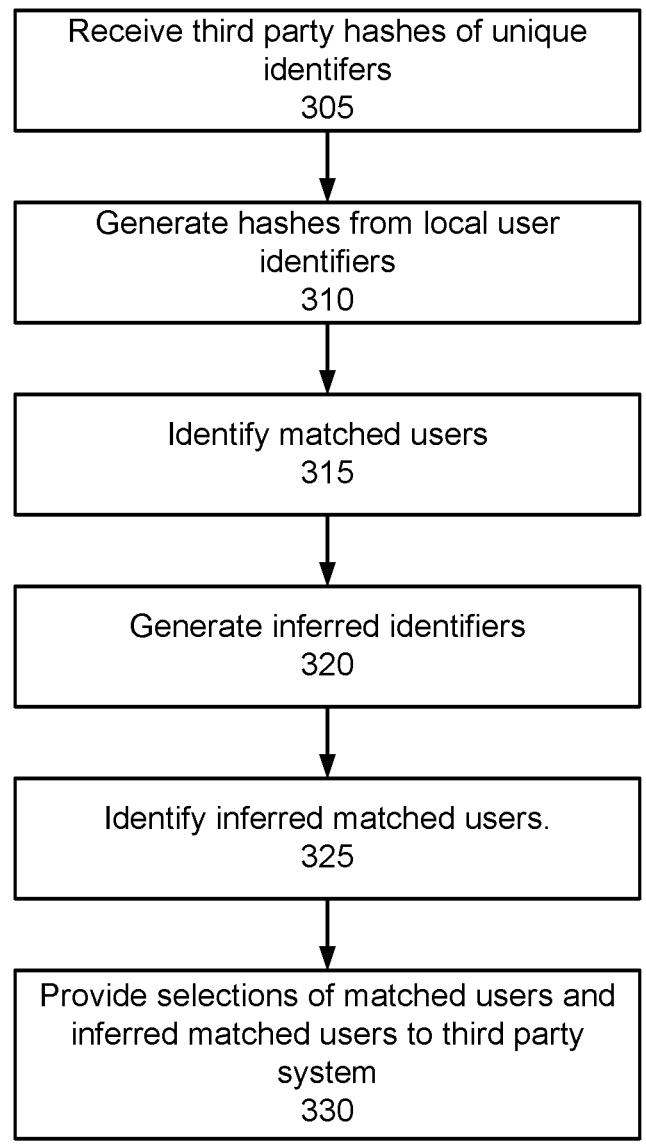
FIG. 3 is a flowchart of one embodiment of a method in an online system for inferring additional identifiers of users to match identifiers in a digest list, according to an embodiment.

The inferred identifier generator 240 generates a list of inferred identifiers based on a list of stored identifiers, such as described in step 320 of FIG. 3. In one embodiment, these identifiers are email addresses. The inferred identifier generator 240 retrieves a set of email addresses stored by the online system 140 (e.g., in the user profile store 205). Each email address includes a prefix, which is the portion before the "@" symbol uniquely identifying a user associated with that email, and a domain, which is to the right of the "@" symbol that identifies the domain of the email. For example, an email address of "john.smith@acme.com" has a prefix of "john.smith" and a domain of "acme.com."

The inferred identifier generator 240 generates variations on the prefixes and domains to generate new combinations of the generated prefixes and domains. For example, the inferred identifier generator 240 may generate a variation on "john.smith@acme.com" as "john.smith@gmail.com." The inferred identifier generator 240 may generate variations for a prefix of an email address based on information stored in the online system 140 for the user associated with the prefix. For example, the inferred identifier generator 240 may generate a new prefix based on an alternative name for the user as stored by the online system 140. The inferred identifier generator 240 may also generate variations on the domain of an email address based on information regarding domains that have a high frequency of occurrence and based on information stored about the user associated with the email address in the online system 140. For example, the inferred identifier generator 240 may generate a few inferred email addresses with the same prefix as the original email address but with a selection of domains including the most popular domains for email addresses for users of the online system 140 (e.g., "hotmail.com," "gmail.com," etc.). In addition, the inferred identifier generator 240 may join the variations of the domains and prefixes in different combinations.

The identifier matcher 245 matches the inferred identifiers generated by the inferred identifier generator 240 with the list of unique identifiers received from by the third party system 130, such as described in step 305 of FIG. 3. In one embodiment, these unique identifiers are email addresses. In some cases, the email addresses received from the third party system 130 are transformed, such as described in step 310 of FIG. 3, using a hash function or other one-way transform. The hash function converts the email address into transformed data from which the original email address cannot be easily recovered (within a feasible timeframe), although transforming the same email address with the same hash function results in the same transformed data. An example of such a hash function is SHA-1. The hash function transformation allows the third party system 130 to provide hashed email addresses to the online system 140 so that the online system 140 cannot actually know the email addresses directly from the hashed data. Instead, the online system 140 hashes locally stored email addresses associated with users of the online system 140 using the same hash function used by the third party system 130 in order to find one that matches a hashed email address provided by the third party system 130.

Thus, in one embodiment, the identifier matcher 245 hashes the original (i.e., not inferred) email addresses of users and compares these with the hashed email addresses provided by the third party system 130. The users of the online system 140 with hashed email addresses that match any of the hashed email addresses from the third party system 130 are identified, such as described in step 315 of FIG. 3, by the identifier matcher 245 as matched users. The identifier matcher 245 removes from the list of inferred email addresses generated by the inferred identifier generator 240 those inferred email addresses generated from the email addresses of now matched users. Subsequently, the identifier matcher 245 hashes some or all of the remaining inferred email addresses generated by the inferred identifier generator 240, and determines whether any of these hashes of the inferred email address match the hashed email addresses provided by the third party system 130, such as described in step 325 of FIG. 3. The users corresponding to those inferred email addresses that matched a hashed email address provided by the third party system 130 are identified as inferred matched users by the identifier matcher 245.

The identifier matcher 245 may provide a selection, such as described in step 330 of FIG. 3, of these matched users and inferred matched users to the third party system 130 for selection.

The error detection unit 250 identifies any errors in the generation of the inferred identifiers. In one embodiment, the error detection unit 250 also corrects for the existence of errors. When generating the inferred identifiers, such as inferred email addresses, the inferred identifier generator 240 may generate errors. As used here, an error in generating an inferred identifier indicates that the inferred identifier that was generated is not (or not likely) to be associated with the user whose identifier was used to generated the inferred identifier. Thus, if such an inferred identifier were matched with an identifier from the third party system 130, the match would be erroneous because the user identified by the identifier from the third party system 130 is not the same user as the user whose identifier was used to generate the inferred identifier.

For example, an inferred email address of "john@gmail.com" may be generated for an original email address of "john@hotmail.com." Since the prefix of "john" is most likely very common, these two email addresses may in some cases belong to different persons, and so by associating the inferred email address with the user of the original email address, an error is generated. As another example, if many inferred email addresses are generated for a prefix by using many domains, a potential rate of error for these inferred email addresses may increase as the number of domain permutations is increased.

After determining the error rate of a particular set of inferred matched users, the error detection unit 250 may indicate this error rate to the third party system 130, and may set a value for these inferred matched users to be lower than the matched users, with the lowering of the value based on the error rate. This lower value may indicate to the third party system 130 that a discount may be applied if the third party system 130 were to target or otherwise utilize this list of inferred matched users.

Additional details regarding the inferred identifier generator 240, the identifier matcher 245, and the error detection unit 250 will be described with reference to FIG. 3.

Although email addresses are used as an exemplary identifier for users here, in other embodiments the online system 140 and the third party system 130 may use different types of identifiers, or a combination of different types of identifiers, to identify users. For example, these may include date of birth, name, postal code, gender, and so on.

By determining the inferred matched users in addition to the matched users, the online system 140 allows a third party system 130 to match a larger number of users of the online system 130 to the list of identifiers provided by the third party system 130. This allows the third party system 130 to target a larger number of users of the online system 140 using its provided list of identifiers. Since the identifiers provided by the third party system 130 are hashed, this causes a problem whereby the online system 140 cannot determine the identity of users with identifiers that are not exact matches. The online system 140 is able to remediate this issue by generating the inferred identifiers for users of the online system 140 while maintaining a low error rate.

Inferring Additional Identifiers of Users to Match Identifiers in a Digest List

FIG. 3 is a flowchart of one embodiment of a method in an online system 140 for inferring additional identifiers of users to match identifiers in a digest list, according to an embodiment. In other embodiments, the method may include different and/or additional steps than those described in conjunction with FIG. 3. Additionally, in some embodiments, the method may perform the steps described in conjunction with FIG. 3 in different orders. In one embodiment, the method is performed by the components of the online system 140, such as the inferred identifier generator 240, the identifier matcher 245, and the error detection unit 250.

Initially, the online system 140, e.g., the identifier matcher 245 as described in conjunction with FIG. 2, receives 305 third party hashes. Each third party hash is a hash of a third party unique identifier, such as an email address, for a corresponding targeted user. In one embodiment, the third party unique identifier is hashed using a one-way transform such that the third party unique identifier from which the third party hash was created cannot be feasibly recovered from the third party hash itself. However, each resulting third party hash is very unlikely to be the same (i.e., have a collision) with any other third party hash generated from different third party identifiers. This allows the online system 140 to receive a list of targeted users, but does not allow the online system 140 the ability to determine any personally identifiable information directly from the third party hashes. Instead, the online system 140 applies to the same transform (e.g., a hash function) to corresponding local data of the same type and attempts to match this transformed information with the transformed third party hashes in order to recover the information within the third party user identifying information. The transform used may be any type of hash function, such as SHA-1, MD5, and so on. The online system 140 may further support a variety of transforms and selects the transform based on the transform that the third party system 130 uses.

Additional details regarding matching transformed identifiers are further described in U.S. Patent Pub. No. 2013/0138569, filed on Nov. 29, 2011, which is hereby incorporated by reference in its entirety.

In addition to receiving 305 the third party hashes, the online system 140, e.g., the identifier matcher 245 as described in conjunction with FIG. 2, also generates 310 local hashes. Each local hash is generated by the online system 140 by hashing a local user unique identifier, such as an email address, using the same transform used to generate the third party hashes. In one embodiment, when a local user has more than one local user unique identifier of the same type (e.g., email), the online system 140 hashes every one of these local user unique identifiers of that local user.

Once the online system 140 has the third party hashes and the local hashes, the online system 140, e.g., the identifier matcher 245 as described in conjunction with FIG. 2, identifies 315 the matched users those local users that have corresponding local hashes that match one of the third party hashes. A match indicates that the local user unique identifier corresponding to that local user, and used by the online system 140 to generate the corresponding local hash, matches the third party unique identifier used to generate the corresponding and matching third party hash.

For example, a third party hash may be a series of alphanumeric characters, such as "d63fee3108-d916c539c057428a782945c53c054d," which is hashed using a hash function, such as SHA-1, from an identifier, such as email address "wile.e.coyote@acme.com." If a local user of the online system 140 also has a registered email address of "wile.e.coyote@acme.com," then the online system 140, after hashing the email address using the same hash function (e.g., SHA-1), generates a local hash that matches the third party hash. By identifying this match, the online system 140 identifies the local user with email address "wile.e.coyote@acme.com" as a matched user. This matched user is a local user that matches one of the targeted users indicated by the third party system 130.

The online system 140, e.g., the inferred identifier generator 240 as described in conjunction with FIG. 2, takes the local user unique identifiers for the local users that were not identified as matched users and generates 320 inferred identifiers for these local user unique identifiers. These inferred identifiers are generated based on the various characteristics of the original local user unique identifiers, and are of the same type as the local user unique identifiers. For example, if the local user unique identifiers are usernames, then the inferred identifiers are also usernames, and if the local the local user unique identifiers are email addresses, then the inferred identifiers are also email addresses.

In one embodiment, the local user unique identifiers are email addresses. In such a case, the online system 140 generates inferred identifiers which are variations on the original email addresses. To do this, the online system 140 divides an email address of a local user into a prefix and domain sections. As noted, the prefix section is the text string before the "@" symbol, and the domain is the text string after the "@" symbol. The online system 140 generates different prefixes and domains and generates inferred email addresses which are combinations of these different prefixes and domains.

To generate the different prefixes, the online system 140 gathers information for the characteristics of the local user associated with the prefix (i.e., the local user associated with the email address that includes the prefix), and generates prefixes based on this information.

In one embodiment, the online system 140 generates prefixes based on variations of the display username for the local user in the online system 140. This display username may be a "vanity" name that the local user has specified in the online system 140. The local user's personal page in the online system 140 may be accessible via this vanity name. The online system 140 takes this display username and may use it directly as a prefix, or may modify it to generate the different prefixes. The online system 140 may modify the display username by removing numerical characters from the display username, appending various profile information of the user, such as date of birth, to the display username, replacing letters in the display username with like appearance numbers (e.g., o with 0), and so on. The online system 140 may use one or more of these modifications of the display username to create additional prefixes for the local user.

In one embodiment, the online system 140 accesses first name, last name, and date of birth information regarding the local user associated with the prefix, and generates additional prefixes based on variations of the first name, last name, and date of birth information. In addition, the local user's middle name or middle initial may be used by the online system 140. The online system 140 may combine the first name, last name, month, year, and/or date of the date of birth (DOB) of the local user in different combinations with different delimiters between each element in order to generate prefixes. For example, for a user with the first name "Bugs" an last name "Bunny" and date of birth of Apr. 30, 1938, the online system 140 may generate prefixes such as "bugs.bunny.041938," "bbunny," "bbunny38," "bugs," "bunny," "bugsb," "bunny_b," and so on. Although many combinations may be generated, the online system 140 may not necessarily generate prefixes that would be too common, as these may result in an erroneous match. For example, the online system 140 may not generate a prefix with the date of birth only.

An erroneous match occurs when a match is positive (successful) but the third party email address used to generate the third party hash is not actually associated with the local user for which the inferred email address was generated. The detection and mitigation of such errors will be described in greater detail below.

In one embodiment, the online system 140 generates prefixes based on other combinations of profile information for the local user. This profile information may include a local user's preferences, places indicated in a location history, indicated job (employment) history, and so on. For example, the online system 140 may determine that a local user "Elmer Fudd" has indicated a preference for shotguns, and so may use a combination of this user's username, last name, first name, date of birth, or other identifier in combination with the term "shotgun" and a noun indicating a positive preference such as "fan" or "lover" along with delimiters to generate a prefix such as "efudd-shotgunlover" or another similar prefix. As another example, if a user indicates that her job title is "engineer," then the online system 140 may generate a prefix based on a variation of the user's name and the term "engineer," along with a possible delimiter. The online system 140 combines multiple pieces of information together as individually this information may be too common and cause erroneous matches.

The online system 140 also generates different domains for a local user based on the characteristics of that local user and based on lists of common domains used by local users of the online system.

In one embodiment, the online system 140 generates different domains based on a list of common domains (e.g., top six) used in email addresses by local users of the online system 140. For example, the online system 140 may use as common domains "hotmail.com," "gmail.com," "yahoo.com," and so on.

In one embodiment, the online system 140 also generates domains based on the geographical information stored in the profile of a local user. The online system 140 may use this geographical information to determine a modified or different list of common domains customized for the geographic location. For example, if the local user indicates that he or she is from Russia, the online system 140 may additionally add or substitute as a common domain the Russian email domain "yandex.ru." In some cases, when a user registers for an email address with one of these domains, the domain automatically creates email addresses for that user with multiple domains (that may be variations on the original domain). For example, a user registering with the "yandex.ru" domain and a particular prefix may also receive an email address with the same prefix but with a domain of "ya.ru," and so on. In these cases, the online system 140 also generates domains with using one or more of these additional domains.

In one embodiment, the online system 140 generates domains based on other profile information of a local user (e.g., demographics). This information may be used to generate additional domains or substitute for a domain in a list of common domains to be generated. In one case, the online system 140 generates domains based on a different list of common domains depending upon the age of the local user indicated in the profile for that user. The different list of common domains may be determined by the online system 140 to be the most popular set of domains for users in that age group. In another case, the online system 140 generates additional domains based upon an entity, such as a place of work, university name, organization, institution, or other group indicated by a local user in the profile of that local user. The online system 140 may consult a master list of domains to determine whether the entity indicated in the profile has a domain, and generate a domain based on that entity according to the master list of domains. For example, a user may indicate that he is currently studying at "Pimento University." The online system 140 accesses the master list of domains and determines that "Pimento University" has a domain of "pu.edu." Thus the online system 140 generates a domain of "pu.edu" for that user.

After generating one or more prefixes and domains for a local user, the online system 140 combines the prefixes and domains into various combinations to generate one or more inferred email addresses. In one embodiment, not all prefixes and domains are combined by the online system 140 into inferred email addresses, as the number of inferred email addresses that would be generated for the local users of the system would be large and exceed resource allotments.

Instead, in one embodiment, the online system 140 assigns a confidence score to each prefix or domain generated, and may only generate inferred email addresses from those prefixes and domains with high confidence scores above a threshold. The online system 140 may assign confidence scores to generated prefixes based on the number of (unique) elements used to generate the prefix and the level of uniqueness of each element. For example, the online system 140 may consider a name to be more unique than a city of birth, and may score a prefix with a name in it higher than a prefix with a city of birth. The online system 140 may score generated domains based on how popular that domain is across the online system 140 for all local users or for local users within the same geographic region as the local user for which the domain is being generated. The online system 140 may also modify the confidence score for the generated domain based on whether the domain is indicated by a characteristic of the local user. For example, the online system 140 may increase the confidence score of a generated domain if that domain was generated based on an organization that the local user has indicated in his or her profile. In one embodiment, the online system 140 simply does not generate prefixes or domains from elements that will result in a low confidence score.

In one embodiment, after, prior to, or during the generation of the prefixes, domains, or inferred email addresses, the online system 140 discards those prefixes, domains, or inferred email addresses that would cause an high number of erroneous matches if hashed and used to match against the third party hashes. As noted, such an error occurs when a match of the inferred email address is positive but the actual third party user (whose email address was used to generate the third party hash) and the local user (whose information was used to generate the inferred email address and the local hash) do not match. While the online system 140 may not be able to know with absolute certainty which inferred email addresses might generate an erroneous match, the online system 140 may be able to mitigate the number of erroneous matches and also estimate a rate of error.

To mitigate the number of errors, the online system 140 may not attempt to generate prefixes for those local users with characteristics that are common in the online system 140 (e.g., beyond a threshold percentage of users). For example, the online system 140 may not generate prefixes for a user if that user's name is a very common one (e.g., "John Smith"). However, the online system 140 may consider the geographic region when making this determination. For example, if within the region of the targeted users, a prefix may be generated for a name (or characteristic) that is not common in that region even though it is common in other regions (e.g., "John Smith" in China may not be very common). The online system 140 may determine the commonality of local user characteristics by surveying these characteristics in local users of the online system 140. These very common characteristics of a local user may be given a very low confidence score such that the online system 140 does not attempt to generate a prefix using these characteristics.

In one embodiment, the online system 140 further excludes prefixes that are below a certain length, as these might cause an increase in erroneous matches (e.g., an inferred email address based on the initials of a user may generate many erroneous matches).

In one embodiment, the online system 140 limits the number of domains that are generated for each local user. For example, the online system 140 may limit the domains generated to the top six, based on a confidence score as determined in the method described above (e.g., those with higher confidence scores are kept), or based on the commonality of that domain with users of the online system 140.

In one embodiment, the online system 140 determines which characteristics to exclude from generation of prefixes, what lengths of prefixes to exclude, and how many domains to generate, based on a computation of an error rate.

In one case, the online system 140 may generate inferred email addresses with prefixes based on certain selected characteristics, of a particular length, and a number of top domains selected in a certain way. In one embodiment, to estimate an error rate for such a generation scheme, the online system 140, e.g., the error detection unit 250 as described in conjunction with FIG. 2, excludes a certain number (e.g., a percentage such as 5%) of users of local users of the online system 140 (or local users within a geographic region). These excluded users are a holdout group. The online system 140 generates inferred email addresses for the local users not in the holdout group according to the particular scheme, and then compares the inferred email addresses with the actual email addresses of the users in the holdout group. Ideally, no matches should be found between the two groups, however this may not be likely. Instead, the number of matches between the inferred email addresses and the email addresses of the holdout group compared to the total number of local users used to generate the inferred email addresses as well as the number of users in the holdout group indicates an estimated error rate for the scheme used to generate the inferred email addresses.

For example, if an email address of a user in the holdout group is "dduck@acme.com," belonging to a user "Daffy Duck," and the online system 140 generates an inferred email address for a user "Donald Duck" that is also "dduck@acme.com" by generating a variation of the user's name and combining it with a common domain, then when the online system 140 compares these two email addresses, an error is detected, as "Daffy Duck" is not the same user as "Donald Duck."

The error rate of a particular inferred email address generation scheme (e.g., use top six domains) may inform the online system 140 regarding the viability of that particular inferred email address generation scheme. The online system 140 may iteratively test various generation scheme permutations to determine the one that minimizes the error rate but still allows the online system 140 to generate a good number of inferred email addresses beyond a threshold or percentage value. The online system 140 may further constrain the characteristics used, may further increase the minimum length of prefixes, and may further limit the number of domains used in the generation of the inferred email addresses to decrease the error rate. The online system 140 may also adjust other factors in the generation of the inferred email addresses in order to reduce the error rate.

After generating a set of inferred email addresses, the online system 140, e.g., the identifier matcher 245 as described in conjunction with FIG. 2, hashes these email addresses using the same hashing scheme used by the third party system 130 and identifies 325 as inferred matched users those local users with hashes of inferred email addresses that match a third party hash.

The online system 140, e.g., the identifier matcher 245 as described in conjunction with FIG. 2, provides 330 a selection of the matched users and the inferred matched users to the third party system 130. In one embodiment, the online system 140 only presents to the third party system 130 an option to select the group of matched users and/or the group of inferred matched users, without revealing additional information regarding personal information for any of the matches. In one embodiment, the online system 140 additionally reveals metadata regarding the matches that does not uniquely identify any of the matches. For example, the online system 140 may indicate a primary geographic region, age group, gender, and other information regarding the matches. As noted above, the online system 140 may compute an error rate for the generation scheme of the inferred matched users, and the online system 140 may present an indication of such an error rate (but not necessarily the error rate itself) to the third party system 130.

In one embodiment, the online system 140 further indicates a bid for the matched users and the inferred matched users. As noted above, a bid is compensation requested by the online system 140 from the third party system 130 for presentation of sponsored content during an impression opportunity to a local user of the online system 140. In such a case, the online system 140 may indicate a lowered bid amount for the inferred matched users compared to the matched users, implicitly indicating that the inferred matched users may not be exact matches compared to the matched users due to potential erroneous matches. The decrease in the bid amount may be computed by the online system 140 based upon the error rate.

Although the identifiers described above were described primarily with regards to email addresses, in one embodiment the online system 140 receives identifiers and generates inferred identifiers that are not email addresses, but are based on other characteristics or combinations of characteristics of users that may be used to reliably identify a user. For example, the identifier may be a composite key, including information identifying a user (e.g., network address, username, first name, last name, postal code, date of birth, etc.).

Although the identification of matched users and inferred matched users as described above first required a hashing step of the unique identifiers and inferred identifiers, respectively, in one embodiment the third party identifiers received from the third party system 130 are not hashed, and thus the online system 140 also does not hash the identifiers before matching them.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at an online system from a third party system, third party hashes for a plurality of targeted users, each third party hash generated from a third party unique identifier of a corresponding targeted user by the third party system;

generating, by the online system, local hashes for one or more local users of the online system, each local hash generated from a local unique identifier of a corresponding local user, the local unique identifier of each local user maintained by the online system;

identifying, by the online system, as matched users those local users with local hashes that match those of the third party hashes corresponding to one of the plurality of targeted users;

generating, by the online system, one or more inferred identifiers for each of the one or more local users excluding the matched users, each inferred identifier newly generated from a combination of identifier sub-elements, the identifier sub-elements being portions of identifiers having a same type as the local unique identifiers of the one or more local users, and wherein the identifier sub-elements are generated from characteristics of each corresponding local user as maintained by the online system;

identifying, by the online system, as inferred matched users at least one of the local users that have local hashes of corresponding inferred identifiers that match a third party hash of a third party unique identifier of one of the plurality of targeted users excluding the matched users; and providing, by the online system to a third party system, a first selection including the matched users and a second selection including the inferred matched users.

2. The method of claim 1, wherein the local unique identifiers are email addresses, and the generation of the one or more inferred identifiers further comprises:

for each of the one or more local users:

generating one or more inferred email prefixes based on combinations of elements stored in the user profile information for the local user;

generating one or more inferred email domains based on a list of top domains; and generating, as the one or more inferred identifiers, combinations of the one or more inferred email prefixes and the one or more inferred email domains.

3. The method of claim 2, wherein the elements stored in the user profile information for the local user including at least one or more of: a display username, date of birth, first name, last name, local user's preferences, a location history of the local user, and a job history.

4. The method of claim 2, wherein the list of top domains is based on at least one of a survey of top email domains associated with users of the online system within at least one of: a geographic region of the local user, and an age bracket for the local user.

5. The method of claim 2, further comprising:

generating one or more inferred domains based on elements stored in the user profile information for the local user, the elements including at least one or more of: an email domain of an entity indicated in the user profile information for the local user.

6. The method of claim 1, further comprising:

assigning a confidence score to each inferred identifier based on a number of unique elements used to generate that inferred identifier; and providing an indication of the confidence score to the third party system.

7. The method of claim 1, further comprising:

determining an error rate of the generation of the inferred identifiers by:

excluding a percentage of the one or more local users prior to generating the inferred identifiers; and responsive to generating the inferred identifiers, determining the error rate as the percentage of the inferred identifiers that match identifiers of users in the excluded local users; and providing an indication of the error rate to the third party system.

8. The method of claim 1, further comprising:

reducing a number of errors by discarding inferred identifiers generated with elements that are common to local users of the online system that are beyond a certain threshold.

9. The method of claim 1, further comprising:

reducing a number of errors by discarding inferred identifiers below a certain length.

10. The method of claim 1, wherein the local hashes are generated using the same hash function used to generate the third party hashes.

11. A computer program product comprising a non-transitory computer readable storage medium having instructions encoded thereon that, when executed by a processor, cause the processor to:

receive, at an online system from a third party system, third party hashes for a plurality of targeted users, each third party hash generated from a third party unique identifier of a corresponding targeted user by the third party system;

generate, by the online system, local hashes for one or more local users of the online system, each local hash generated from a local unique identifier of a corresponding local user, the local unique identifier of each local user maintained by the online system;

identify by the online system, as matched users those local users with local hashes that match those of the third party hashes corresponding to one of the plurality of targeted users;

generate, by the online system, one or more inferred identifiers for each of the one or more local users excluding the matched users, each inferred identifier newly generated from a combination of identifier sub-elements, the identifier sub-elements being portions of identifiers having a same type as the local unique identifiers of the one or more local users, and wherein the identifier sub-elements are generated from characteristics of each corresponding local user as maintained by the online system;

identify, by the online system, as inferred matched users at least one of the local users that have local hashes of corresponding inferred identifiers that match a third party hash of a third party unique identifier of one of the plurality of targeted users excluding the matched users;

provide, by the online system to a third party system, a first selection including the matched users and a second selection including the inferred matched users.

12. The computer program product of claim 11, wherein the local unique identifiers are email addresses, and the generation of the one or more inferred identifiers comprises further instructions, that when executed by the processor, cause the processor to:

for each of the one or more local users:

generate one or more inferred email prefixes based on combinations of elements stored in the user profile information for the local user;

generate one or more inferred email domains based on a list of top domains; and generate, as the one or more inferred identifiers, combinations of the one or more inferred email prefixes and the one or more inferred email domains.

13. The computer program product of claim 12, wherein the elements stored in the user profile information for the local user including at least one or more of: a display username, date of birth, first name, last name, local user's preferences, a location history of the local user, and a job history.

14. The computer program product of claim 12, wherein the list of top domains is based on at least one of a survey of top email domains associated with users of the online system within at least one of: a geographic region of the local user, and an age bracket for the local user.

15. The computer program product of claim 12, comprising further instructions, that when executed by the processor, cause the processor to:

generate one or more inferred domains based on elements stored in the user profile information for the local user, the elements including at least one or more of: an email domain of an entity indicated in the user profile information for the local user.

16. The computer program product of claim 11, comprising further instructions, that when executed by the processor, cause the processor to:

assign a confidence score to each inferred identifier based on a number of unique elements used to generate that inferred identifier; and provide an indication of the confidence score to the third party system.

17. The computer program product of claim 11, comprising further instructions, that when executed by the processor, cause the processor to:

determine an error rate of the generation of the inferred identifiers by:

excluding a percentage of the one or more local users prior to generating the inferred identifiers; and responsive to generating the inferred identifiers, determining the error rate as the percentage of the inferred identifiers that match identifiers of users in the excluded local users; and provide an indication of the error rate to the third party system.

18. The computer program product of claim 11, comprising further instructions, that when executed by the processor, cause the processor to:

reduce a number of errors by discarding inferred identifiers generated with elements that are common to local users of the online system that are beyond a certain threshold.

19. The computer program product of claim 11, comprising further instructions, that when executed by the processor, cause the processor to:

reduce a number of errors by discarding inferred identifiers below a certain length.

20. The computer program product of claim 11, wherein the local hashes are generated using the same hash function used to generate the third party hashes.

* * * * *

UNITED STATES PATENT AND TRADEMARK OFFICE
CERTIFICATE OF CORRECTION

Page 1 of 1

PATENT NO. : 10,165,063 B2
APPLICATION NO. : 15/184974
DATED : December 25, 2018
INVENTOR(S) : Aleksey Sergeyevich Fadeev and Li Zhou It is certified that error appears in the above-identified patent and that said Letters Patent is hereby corrected as shown below:

In the Claims

Column 17, Line 23, Claim 1, delete "a third party unique identifier" and insert -- the third party unique identifier --

Column 17, Line 26, Claim 1, delete "a third party system" and insert -- the third party system --

Column 18, Line 32, Claim 11, after "identify" insert -- , --

Column 18, Line 49, Claim 11, delete "a third party unique identifier" and insert -- the third party unique identifier --

Column 18, Line 51, Claim 11, delete "a third party system" and insert -- the third party system --

Signed and Sealed this
First Day of October, 2019

Andrei Iancu
*Director of the United States Patent and Trademark Office*